(12) United States Patent
Klauzenberg et al.

(10) Patent No.: US 6,601,905 B1
(45) Date of Patent: Aug. 5, 2003

(54) CONVERTIBLE POWER TOP AND POWER WINDOW SWITCH

(75) Inventors: David E Klauzenberg, Waterford, MI (US); Ronald W Siebenschuh, Romeo, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/754,918

(22) Filed: Jan. 5, 2001

(51) Int. Cl.[7] .................................................. B60J 7/00
(52) U.S. Cl. ............. 296/107.07; 296/117; 296/107.01; 296/100.17; 296/146.4
(58) Field of Search ........................... 296/107.07, 117, 296/107.09, 116, 146.14, 146.16, 155, 146.4, 112, 136; 716/8, 9; 700/121; 318/266, 468

(56) References Cited

U.S. PATENT DOCUMENTS

| | | | | |
|---|---|---|---|---|
| 5,110,175 A | * | 5/1992 | Fischbach ................... | 296/117 |
| 5,208,483 A | * | 5/1993 | Reneau ........................ | 318/466 |
| 5,558,388 A | * | 9/1996 | Furst et al. ................... | 296/107 |
| 5,688,019 A | * | 11/1997 | Townsand ................... | 296/146.4 |
| 5,749,617 A | * | 5/1998 | Weissrich et al. ............ | 296/107 |
| 6,019,416 A | * | 2/2000 | Beierl ......................... | 296/107.17 |
| 6,035,254 A | * | 3/2000 | Ritter et al. ................. | 296/107.01 |
| 6,054,821 A | * | 4/2000 | Koch et al. .................. | 318/266 |
| 6,056,348 A | * | 5/2000 | Tsuda et al. ................. | 296/146.16 |
| 6,102,771 A | * | 8/2000 | Poznick et al. .............. | 296/107.17 |
| 6,138,068 A | * | 10/2000 | Liu .............................. | 701/49 |
| 6,150,781 A | * | 11/2000 | Hollerbach .................. | 318/283 |
| 6,164,713 A | * | 12/2000 | Graf et al. ................... | 296/107.08 |

* cited by examiner

*Primary Examiner*—Ken Patel
(74) *Attorney, Agent, or Firm*—Ralph E. Smith

(57) ABSTRACT

An automotive vehicle with a retractable top has a switch for operating the retractable top and windows, both, at the same time. The switch has circuitry for electrically coupling the switch with a power source, at least one vehicle window and the retractable top. The switch has a neutral position and first, second and third positions. When the switch is in its first position, the top moves from a first or cover position to a second retractable position. When the switch is in its second position, if necessary, the top continues to move to its lowered position while the at least one window is moved from a first or up position to a second or lowered position. In the third position, the switch moves the top from the second or lowered position to the first or cover position.

12 Claims, 5 Drawing Sheets

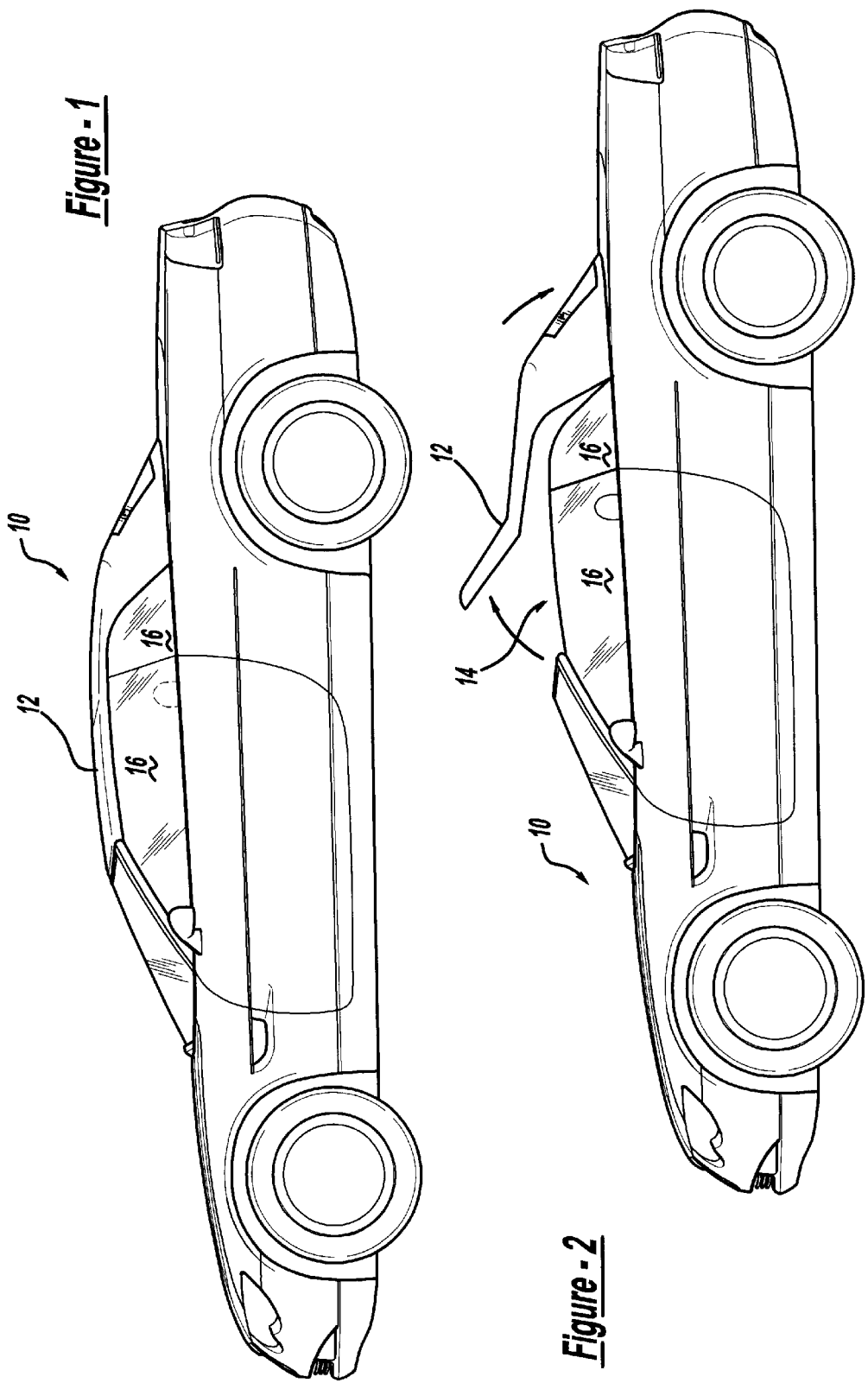

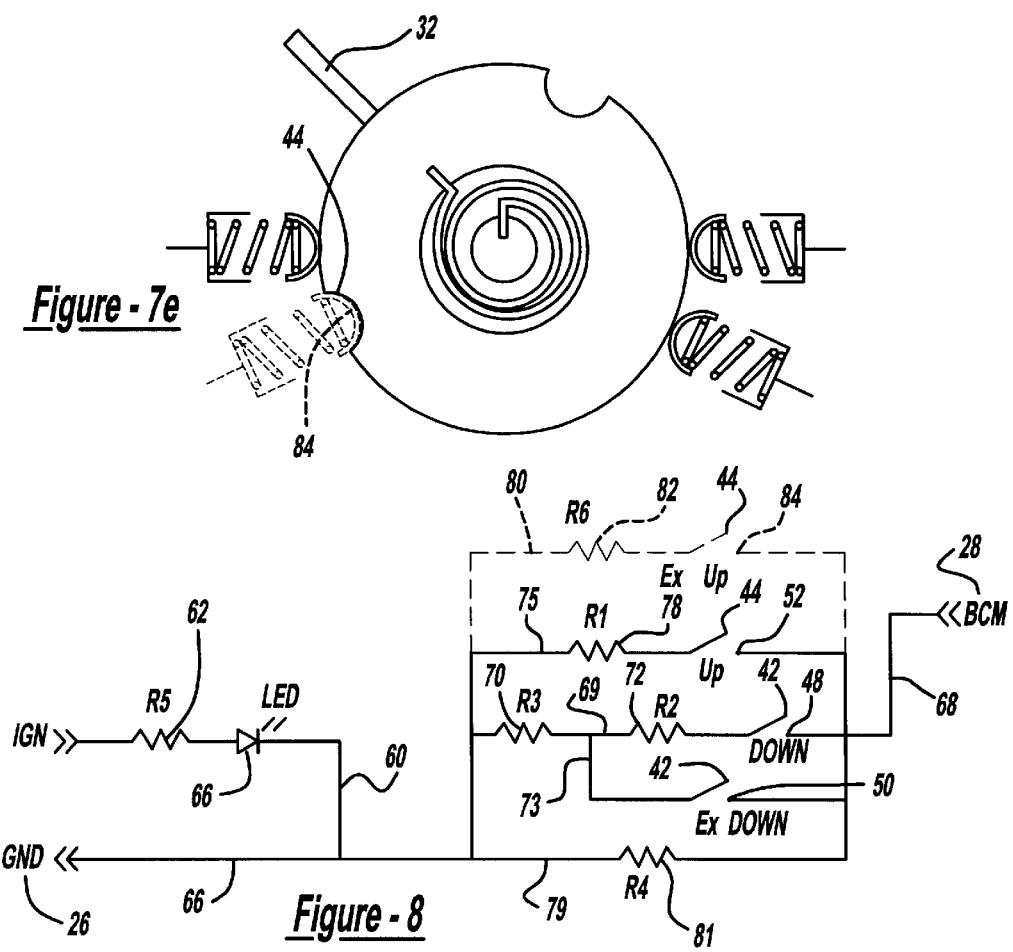

CONVERTIBLE POWER TOP AND POWER WINDOW SWITCH

FIELD OF THE INVENTION

The present invention relates to vehicles with convertible tops, and more particularly to a switch for raising and lowering the vehicle top and all of the side windows.

BACKGROUND

In automotive vehicles that have convertible or movable tops, it is desirable on a nice sunny day to lower the top. Ordinarily, the driver releases the top from the windshield and actuates a switch which automatically lowers the top. After doing this, if desirable, the driver may then lower the windows by actuating a separate switch for the windows. It is desirable that, if the driver wishes to lower the windows, the driver could lower the windows while lowering the top.

SUMMARY OF THE INVENTION

The present invention provides the art with a switch which enables the top and windows to be lowered at the same time. The present invention also enables the top to be lowered by itself and, if the top is already down, to lower all of the windows together. Also, the switch enables the top to be raised to cover the passenger compartment. Thus, it is an object of the present invention to provide the art with a switch mechanism which enables a vehicle convertible top, as well as all of the side windows, to be lowered at the same time.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 1 is a side view of a vehicle in accordance with the present invention.

FIG. 2 is a view like FIG. 1 with the top moving down and the windows up.

FIGS. 7a–7e are schematic views of the switch of FIG. 6 in various positions.

FIG. 8 is a schematic view of the circuitry of the switch of FIG. 6.

DETAILED DESCRIPTION OF THE PREFERRED EMBODIMENTS

Figure 3:
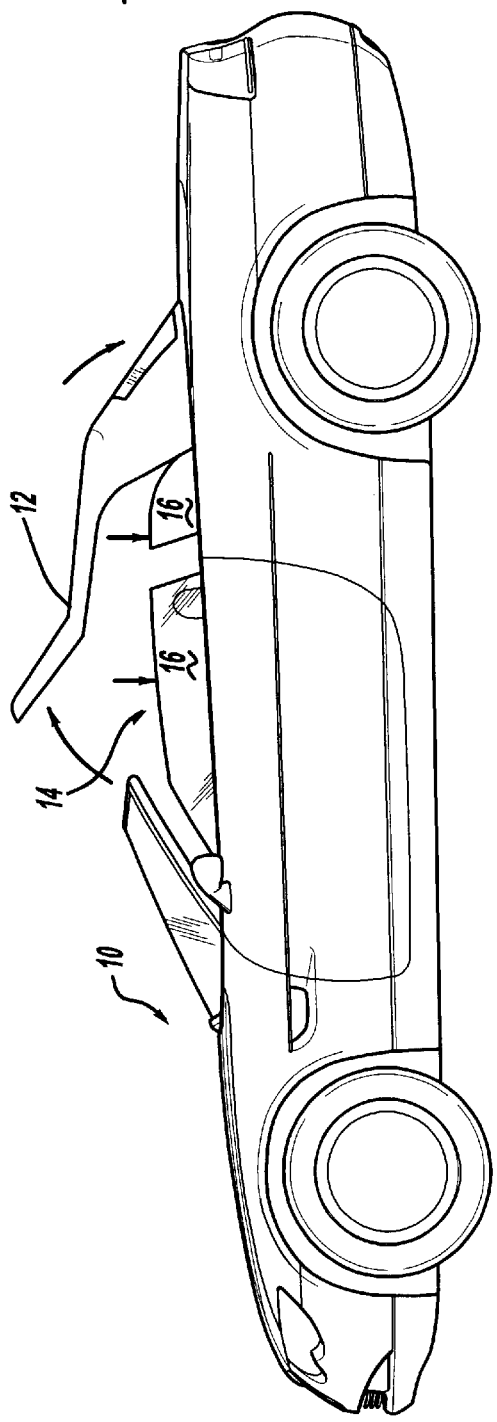
FIG. 3 is a view like FIG. 2 with the top and windows moving down.
Figure 4:
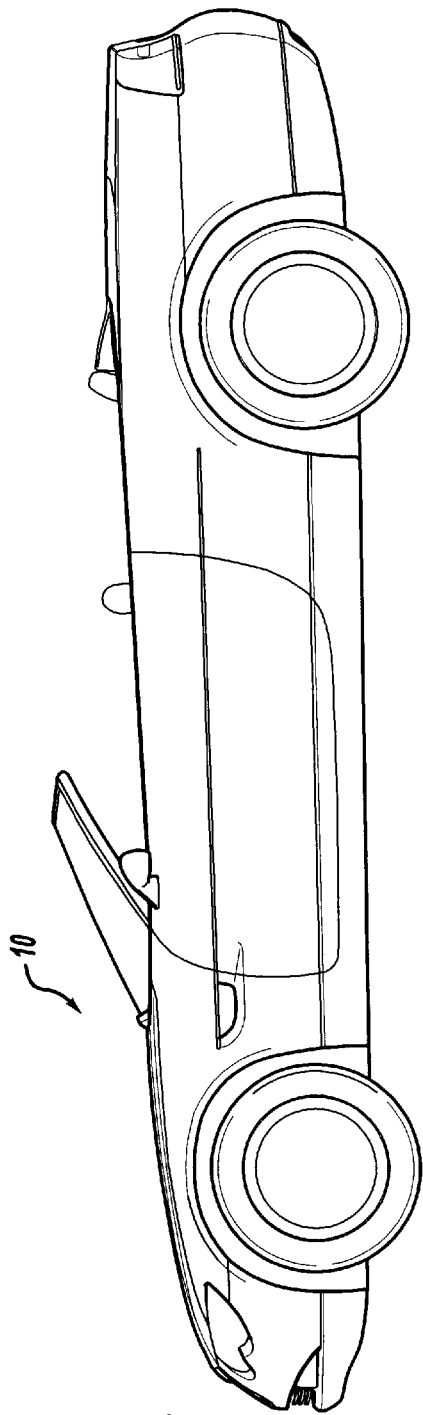
FIG. 4 is a view like FIG. 3 with both the top and windows in a lowered position.
Figure 5:
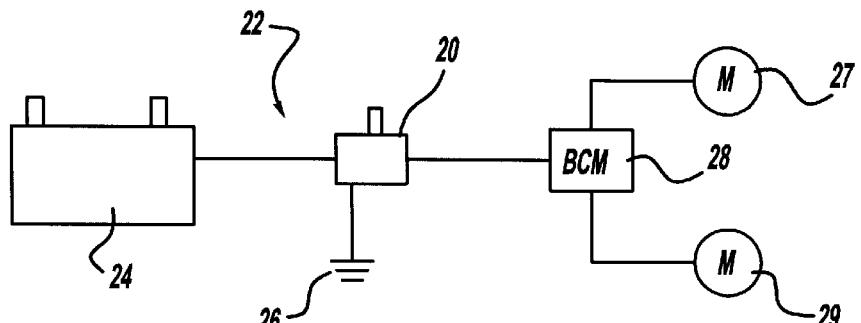
FIG. 5 is a schematic view of a circuit for operating the top and windows.

Turning to the figures, FIGS. 1 through 4 illustrate an automotive vehicle which is designated with the reference numeral 10. The vehicle 10 includes a convertible or movable top 12 which moves from a first position, covering the passenger compartment 14 as illustrated in FIG. 1, to an uncovered or second position as shown in FIG. 4. FIGS. 2 and 3 show the top 12 moving from one position to the next. Also, the windows 16 enclose the passenger compartment 14.

A switch 20 is positioned within the passenger compartment of the vehicle 10. The switch 20 may be positioned on the console or dashboard of the vehicle. The switch 20 operates the raising and lowering of the convertible top 12. The resistive switch 20 is electrically coupled with circuitry 22 to actuate the convertible top actuators as well as the window actuators. Briefly, the circuitry 22 has a power source such as the vehicle battery 24 which provides power to the switch 20. The switch 20 is grounded as shown at 26. The switch 20 is also electrically coupled with the vehicle body control module 28 or vehicle computer which controls the vehicle top motor actuators 27 as well as the window actuator motors 29.

Figure 6:
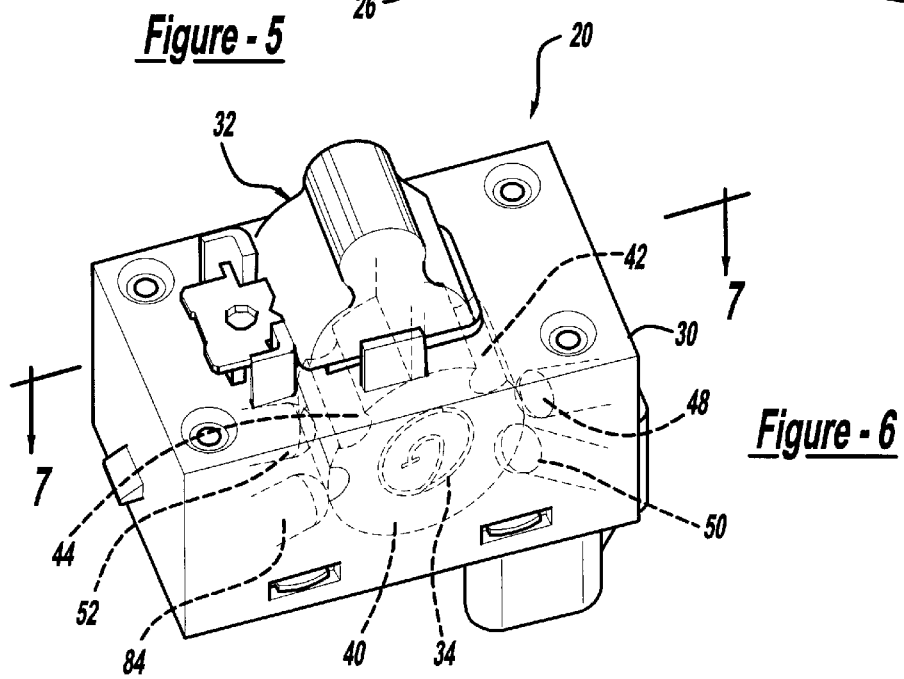
FIG. 6 is an enlarged perspective view of the switch in accordance with the invention.

The switch 20 includes a casing 30 and a switch member 32. The switch member 32 in this example is of the toggle type moving in two directions. The switch 32 may include a spring mechanism 34 which biases the switch into a neutral position as shown in FIG. 6 where the switch member 32 is in the center of the casing 30. The switching member 32 includes a base 40 which is rotatable in the casing 30. The base 40 includes detent contacts 42 and 44. These contacts 42 and 44 couple with electrical contacts 48, 50 and 52 to energize the actuator motors as described herein. The body 40 is also coupled with spring 34 which biases the switch member 32 to its neutral position when force is not applied to the switch member 32.

The switch 20 operates as follows. Turning to FIGS. 7 and 8, the schematics of the switch are shown. The switch 20 includes lead line 60 which electrically couples with switch 20 from the ignition which, in turn, is coupled with battery 24. A resistor 62 as well as an LED 64 are in lead line 60. The LED 64 is illuminated during the operation of the switch. Also, lead line 66 couples between ground 26 and switch 20. Lead line 68 electrically couples the switch 20 with the body control module 28.

Figure 7A:
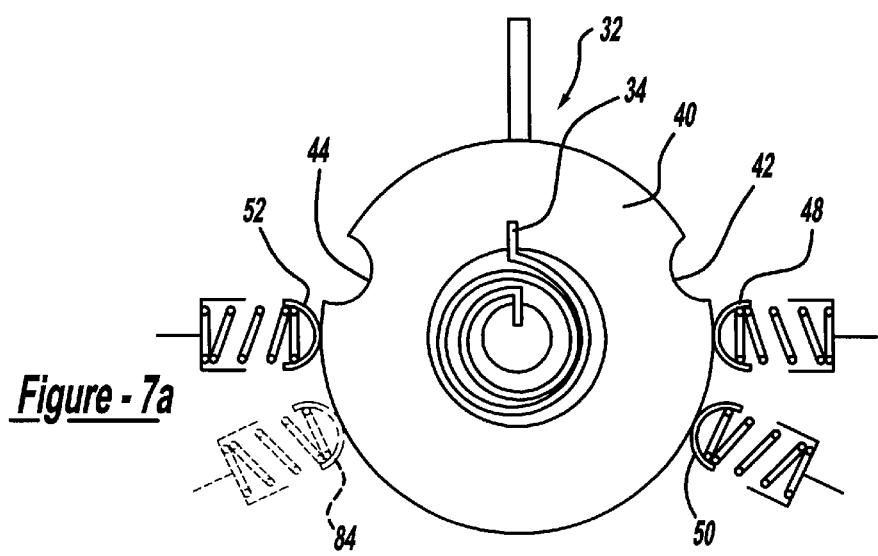
Figure 7B:
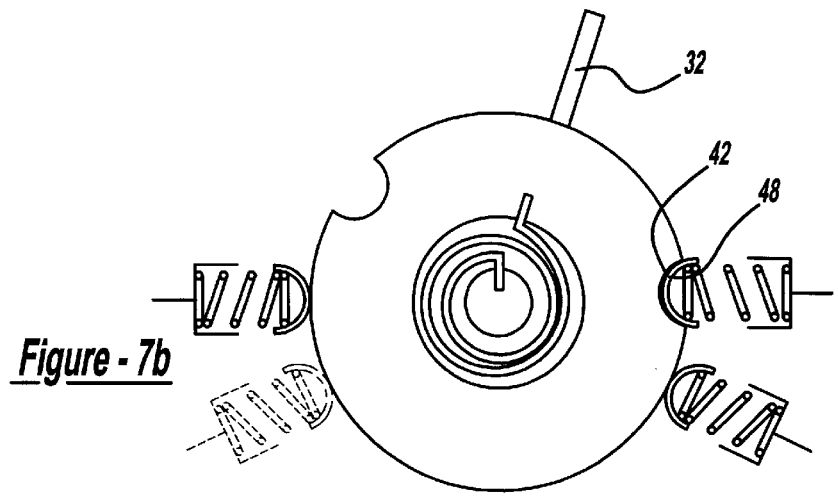
Figure 7C:
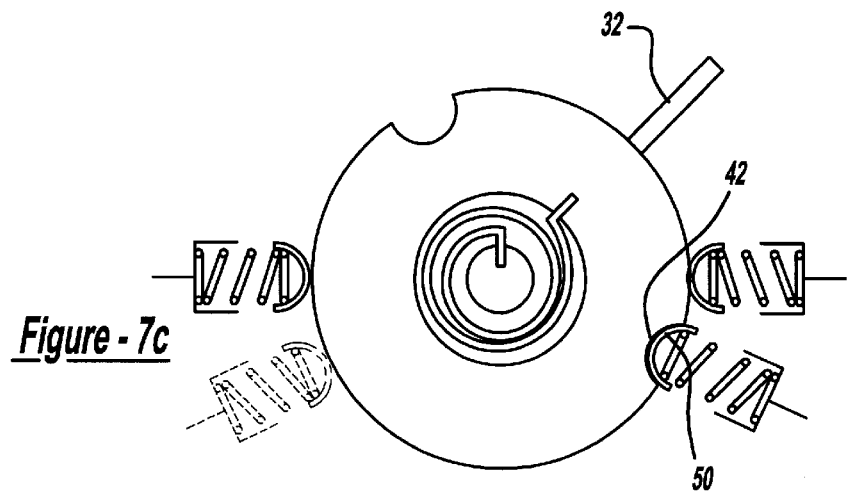

The switch member 32 may be moved into three different positions from the neutral position (FIG. 7a). In the first position (FIG. 7b), contact 42 would be electrically coupled with contact 48. The circuit is complete enabling current to flow along lead line 69 through resistors 70 and 72 which, in turn, produce a resistance signal which is transmitted to the body control module 26. The signal is interpreted by the body control module 26. The signal communicates to the body control module 26 to lower the top from a first covered position as shown in FIG. 1 to an uncovered second position as shown in FIG. 4. In turn, the body control module 26 transmits a signal to the actuator motor 27, activating the motor, which, in turn, begins lowering of the top as seen in FIG. 2.

If the driver desires to lower the windows 16 at the same time as the top 12, the switch 20 is moved from the first position to the second position (FIG. 7c) where electrical contact 42 is electrically coupled with contact 50. In this position, if necessary, the top 12 continues to move to its down second position and the windows move to a down position as seen in FIG. 3. If the driver would remove force from the switching member 32, spring 34 would return the switching member 32 to its neutral position. Note that in both of the switch's first and second position, a detent is established so that the operator knows, through the catch of the detent, that the switch 20 is in the first or second position. As the circuit is closed along lead line 73, which includes resistor 70, a signal is sent from the switch 20 to the body control module 28. At this time, the body control 28 module transmits a signal to the window actuators 29 to move the windows to a down position. Also, the body control module 28 would continue to transmit a signal to the top actuator motor 27 to continue the down movement of the top 12, if required. The different resistance signals from the switch 20 to the body control module 28 are interpreted by the body control module to initiate the two processes of lowering the top and lowering the windows.

Figure 7D:
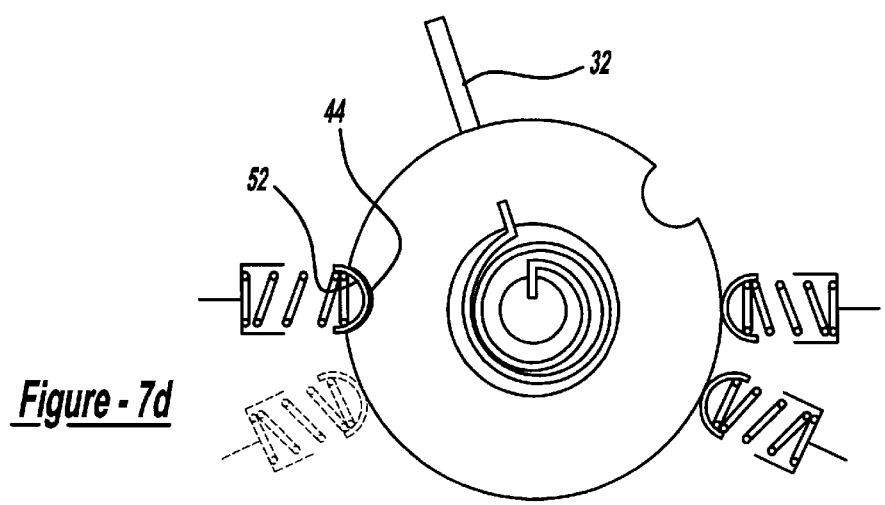

In order to raise the top 12 to its covered position as illustrated in FIG. 1, the switch member 32 is moved in a forward direction to its third position (FIG. 7d). In its third position, contact 44 is electrically coupled with contact 52. Here, likewise a detent is established so that the operator knows that the position has been reached. The electrical circuit along lead line 75, which includes resistor 78, is closed so that a resistance signal is sent from the resistance switch 20 to the body control module 28. The body control module 28 interprets the resistance signal and, in turn, transmits a signal to the top actuator motor 27 to raise the top 12. Likewise, if force is removed from the switch member 32, the switch member 32 would revert to its neutral position via spring 34. The different resistance signals, determined by the resistors R1–R5, sent to the body control module 28 trigger the body control module 28 to initiate the three disclosed modes of operation. Thus, the switch 20 enables the top 12 and all of the windows 16 to be lowered by the operator from a single switch while the operator is lowering the top 12. Also, lead line 79 with resistor 81 enables a signal to be transmitted to the body control module 28 that the switch is in its neutral position.

FIG. 8 shows lead line 80 in phantom. Resistive path 80 is illustrated in phantom and includes resistor 82. Resistive path 80 includes an additional electrical contact 84 which would electrically couple with contact 44 (FIG. 7e). The additional circuit would enable the top 12 to be raised along with all four windows 16 at the same time. Accordingly, a signal would be sent along lead line 80 to the body control module 28 which, in turn, would transmit a signal to both the top 27 and window 29 actuators to raise both the top 12 and the windows 16.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A switch for operating a vehicle top and windows comprising:
   a switch having circuitry adapted for electrically coupling the switch with a power source, at least one vehicle window and a movable vehicle top;
   said switch having a neutral position, a first position where said switch moves said movable top from a first position to a second position, a second position where said switch, if necessary, continues to move said top from said first position to said second position and moves said at least one window from a first to a second position, and a third position where said switch moves said top from said second position to said first position.

2. The switch according to claim 1, wherein said switch has a first detent enabling said switch to catch in said first position.

3. The switch according to claim 2, wherein said switch includes a second detent for enabling said switch to catch in said second position.

4. The switch according to claim 3, wherein said switch includes a third detent for enabling said switch to catch in said third position.

5. The switch according to claim 1, wherein said switch having a fourth position where said switch, if necessary, continues to move said top from said second position to said first position and moves said at least one window from said second position to said first position.

6. A vehicle with a movable top comprising:
   a vehicle body with a passenger compartment, a movable top and at least one movable window;
   a switch having circuitry adapted for electrically coupling the switch with a power source, at least one vehicle window and a movable vehicle top;
   said switch having a neutral position, a first position where said switch moves said movable top from a first position to a second position, a second position where said switch, if necessary, continues to move said top from said first position to said second position and moves said at least one window from a first to a second position, and a third position where said switch moves said top from said second position to said first position.

7. The vehicle according to claim 6, wherein said vehicle has a plurality of windows, activation of said switch moves all of said plurality of windows.

8. The vehicle according to claim 6, wherein said top in said first position covers said passenger compartment and in said second position said passenger compartment is uncovered.

9. The vehicle according to claim 6, wherein said switch has a first detent enabling said switch to catch in said first position.

10. The vehicle according to claim 9, wherein said switch includes a second detent for enabling said switch to catch in said second position.

11. The vehicle according to claim 10, wherein said switch includes a third detent for enabling said switch to catch in said third position.

12. The vehicle according to claim 6, wherein said switch having a fourth position where said switch, if necessary, continues to move said top from said second position to said first position and moves said at least one window from said second position to said first position.

* * * * *